United States Patent
Chaabane et al.

(10) Patent No.: US 10,637,757 B2
(45) Date of Patent: Apr. 28, 2020

(54) DEVICE AND METHOD FOR MONITORING AND ALLOCATING COMPUTER INFRASTRUCTURE RESOURCES

(71) Applicant: BULL SAS, Les Clayes Sous Bois (FR)

(72) Inventors: Wajih Chaabane, Chambery (FR); Bruno Demeilliez, Saint Martin d'Uriage (FR); Florent Rochette, Seyssinet Pariset (FR)

(73) Assignee: BULL SAS, Les Clayes sous Bois (FR)

( * ) Notice: Subject to any disclaimer, the term of this patent is extended or adjusted under 35 U.S.C. 154(b) by 197 days.

(21) Appl. No.: 15/850,103

(22) Filed: Dec. 21, 2017

(65) Prior Publication Data

US 2018/0191589 A1 Jul. 5, 2018

(30) Foreign Application Priority Data

Dec. 29, 2016 (FR) ...................................... 16 63520

(51) Int. Cl.
| | | |
|---|---|---|
| H04L 12/26 | (2006.01) | |
| H04L 12/911 | (2013.01) | |
| H04L 29/08 | (2006.01) | |
| G06F 9/50 | (2006.01) | |
| G06F 11/34 | (2006.01) | |

(52) U.S. Cl.
CPC ................ *H04L 43/08* (2013.01); *G06F 9/50* (2013.01); *H04L 47/70* (2013.01); *H04L 67/306* (2013.01); *G06F 11/3433* (2013.01); *G06F 2209/508* (2013.01)

(58) Field of Classification Search
CPC ....... H04L 43/08; H04L 47/70; H04L 67/306; G06F 9/50; G06F 11/3433; G06F 2209/508
See application file for complete search history.

(56) References Cited

U.S. PATENT DOCUMENTS

| | | | | |
|---|---|---|---|---|
| 9,851,933 B2 * | 12/2017 | Brech | ................. | H04L 41/0893 |
| 10,360,123 B2 * | 7/2019 | Cardonha | ........... | G06F 9/44505 |
| 2007/0244930 A1 * | 10/2007 | Bartlette | ............. | G06F 9/44505 |
| 2011/0055371 A1 * | 3/2011 | Serban | ................ | H04L 63/1416 709/224 |
| 2012/0297385 A1 | 11/2012 | Arlitt et al. | | |
| 2015/0026348 A1 * | 1/2015 | Siddiqui | ................... | G06F 9/46 709/226 |

OTHER PUBLICATIONS

Vincent C Emeakaroha et al., "Low level Metrics to High level SLAs—LoM2HiS framework: Bridging the gap between monitored metrics and SLA parameters in cloud environments", High Performance Computing and Simulation (HPCS), 2010 International Conference on, IEEE, Piscataway, NJ, USA, Jun. 28, 2010, pp. 48-54, XP031731503, ISBN: 978-1-4244-6827-0.

* cited by examiner

*Primary Examiner* — Abdullahi E Salad
*Assistant Examiner* — Robert B McAdams
(74) *Attorney, Agent, or Firm* — Hauptman Ham, LLP

(57) ABSTRACT

The present invention relates to a device and a method for monitoring and allocating resources of the IT infrastructures for an application chain, as a function of an estimation of the consumption of resources of users who are distributed between different profiles in turn determined as a function of business actions taken by users and their control over the application chain.

10 Claims, 1 Drawing Sheet

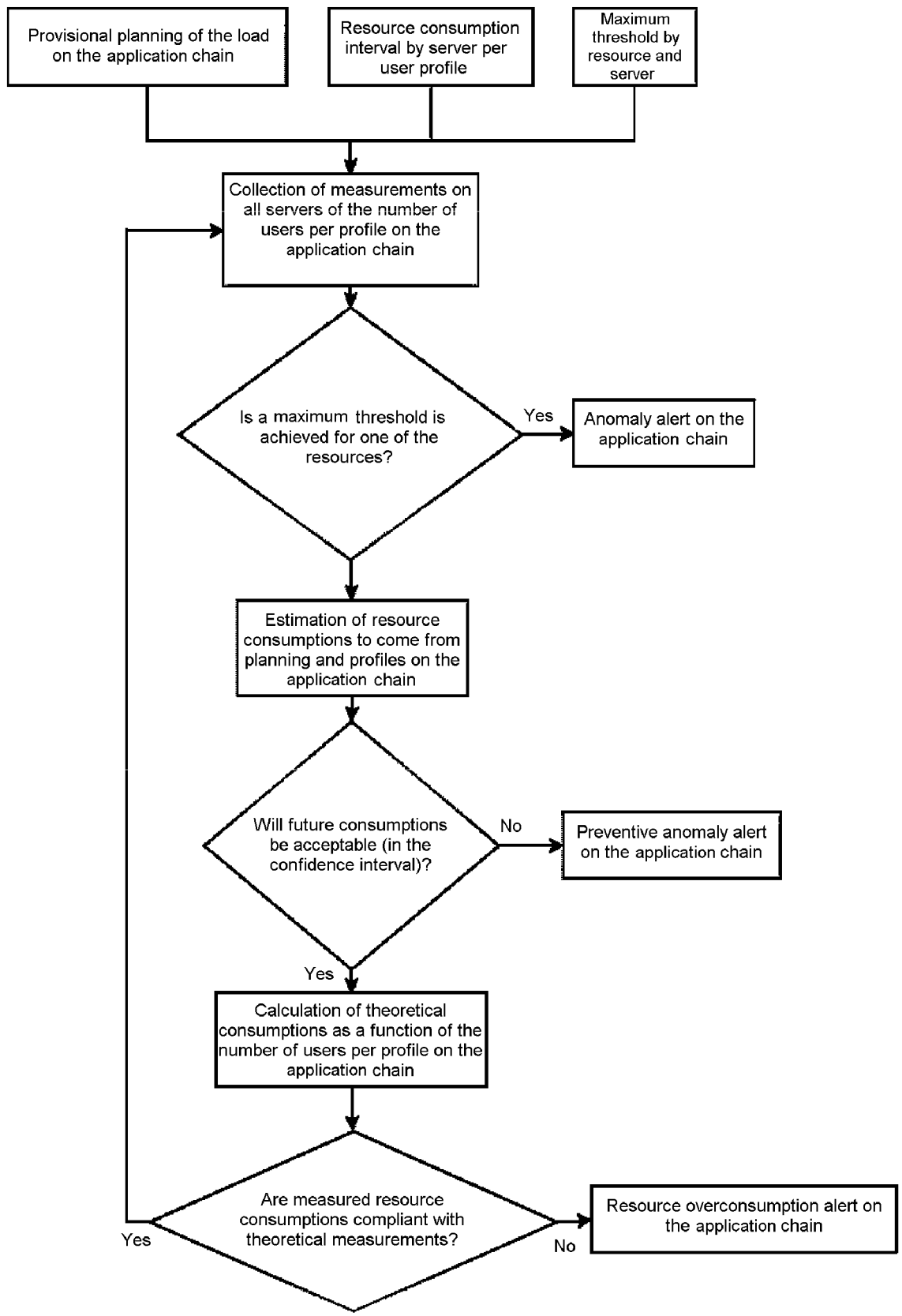

DEVICE AND METHOD FOR MONITORING AND ALLOCATING COMPUTER INFRASTRUCTURE RESOURCES

TECHNICAL FIELD OF THE INVENTION

The invention relates to the field of monitoring of performances of IT infrastructures and more particularly to that of performances of systems in production.

PRIOR ART

Computer applications are experiencing significant variations in their level of use.

These variations are due to the number of users connected simultaneously during the day, and to their profile of use.

There are devices for monitoring and allocating resources which allocate an amount of resources as a function of levels of use/saturation in developing provisional planning of levels of use. In fact, levels of use can vary:
- in the day (for example, work hour schedules relative to the rest of the day)
- in the week (for example, Wednesday day off for some employees, weekend relative to week days)
- in the month and year (for example, monthly, quarterly, annual period, etc.)

But in the absence of tools and time, administrators of applications dimension the IT infrastructure used by these applications so as to always ensure a good level of service during peak periods by allocating maximum resources available. It eventuates that during some periods, a more or less substantial amount of resources is not used, while others are in high or even excessive demand.

Therefore there is a need for a device for monitoring and allocating resources for eliminating at least some of the drawbacks of the prior art by adjusting in real time the amount of resources allocated as a function of the amount of resources really used to optimize the use of resources freeing up resources for other applications and at the same time lowering the cost of IT infrastructure of the application chain.

EXPLANATION OF THE INVENTION

For this reason, the invention relates to a device comprising at least one computer machine and software for implementing a mechanism for monitoring performances of IT infrastructures for an IT infrastructure making up the linking chain of a determined application, characterized in that the device is constituted by at least:
- a hardware and software arrangement for identification and planning of the number of users according to their profile for a given application, comprising at least:
  i. an identification module on the one hand enabling identification of a user by association of an identifier with his control profile of the determined application for a time period (T), then ensuring on the other hand storing of the identifier in a memory.
  ii. an evaluation module on the one hand enabling evaluation of the number of users distributed according to their profile as a function of their habit of use of the determined application for the period (T), then ensuring on the other hand storing in a memory in the form of planning,
- a hardware and software arrangement for allocation of the IT infrastructure resources making up the linking chain of the application, comprising at least:
  i. for a given time period (T), an allocation module enabling allocation of an interval of allocatable resources on the IT infrastructure making up the linking chain of the application as a function of the profile and number of users,
- a hardware and software arrangement for monitoring, by application, the consumptions of the IT infrastructure resources making up the linking chain of the application, comprising a measuring repository,
  i. said measuring repository comprising a hardware and software arrangement for measuring, by consumption probes, of the level of use of each resource over the entire IT infrastructure making up the application chain during the given time period (T), then enabling storing in a memory of these levels of use in the measuring repository, in association with the given period (T),
  ii. an evaluation and adjustment module of resources allocated for an interval defined by the given time period (T) and by a later period (T+1) of use as a function of an estimation of the number of users distributed according to their profile for a given period (T) and the later period (T+1).

Module here means a set of codes executable on a computer system for performing the functionalities described for the module.

Time period means all time periods ranging from a few milliseconds to a year by passing through seconds, minutes, hours, days, week and month.

In this way, such a device controls the variations in load as a function of the number of users but also as a function of the type of user (profile). In fact, each user has a determined profile (by the nature of his activity, his habit of use of the application, etc.); qualification of profiles specifically allocates to such a profile an amount of resources which corresponds to the needs of the user as far as possible, thus redirecting those resources not used to other applications.

According to a particular feature, consumption probes are associated with each resource for feeding back and recording in memory, as a function of each user, measuring information or metrics, representing the level of use of the resources (Nur), for a determined time period (T).

According to another particular feature, planning recorded in memory anticipates the number of users and the distribution of their profile during a given time period (T).

Advantageously, each user profile comprises a stored categorization attribute (novice, confirmed, expert) and a resource interval usable by profile for each categorization is determined as a function of the number of users.

According to a particular feature, a control module of resources allocated for each interval for detecting anomalies and signaling alerts in real time when:
- the maximum threshold of a resource is achieved,
- the consumption of theoretical resources provided and stored as a function of the connected user profiles does not correspond to the measured consumption, and/or
- the estimation of the consumption of the resources of the application chain is outside the intervals determined earlier.

Another aim of the present invention is a method for monitoring performances of the IT infrastructures making up the linking chain of a determined application, implemented by software executed on at least one machine of the IT infrastructure, characterized in that it comprises:
- a collection step of a number of users and profiles on the application chain for a given time interval T, a determination step of a level of consumption of resources necessary for each user profile during the time interval T as a function of the number of users, an allocation step of an interval of allocatable resources to the application linking chain, an evaluation step of the number of users per profile on the application chain for the later time interval T+1, a verification step of the resource interval previously allocated for each of the profiles as a function of the number of users on the later time interval T+1, an alert step when the resource interval previously allocated does not correspond to the number of users on the later time interval T+1, and optionally, a modification step of the amount of resources previously allocated for anticipating the level of consumption of resources necessary for each profile user for the later time period T+1.

According to another particular feature, during the allocation step of an interval of allocatable resources to the application linking chain, a machine of the IT infrastructure verifies whether a maximum threshold of allocation of a resource is achieved, by comparing the limit of the interval to a maximum value previously recorded in the memory, and if necessary an anomaly alert signal on the application chain is then sent by the machine of the IT infrastructure having performed the verification.

Advantageously, during the verification step of the size of the space previously allocated for a number of users on the later time interval T+1, a machine of the IT infrastructure signaling a preventive anomaly alert on the application chain when the consumptions for the time interval T+1 are not in the resource interval allocated for the time interval T.

According to a particular feature, the method comprises a measuring step of the level of resources used in real time and a comparison step of the level of resources used in real time with the level of resources previously allocated, a machine of the IT infrastructure signaling an overconsumption alert of resources on the application chain when the consumption of the resources measured in real time is less than the level of resources allocated.

According to another particular feature, the method comprises an automation step of the modification of the amount of resources allocated when an alert has been sent.

Such a device and such a method correctly dimension the application chain as a function of its seasonality or during deployment of a new application as a function of its different provisioning phases.

BRIEF DESCRIPTION OF THE FIGURES

Other characteristics, details and advantages of the invention will become more clearly apparent upon reading the following description in reference to the appended FIGURES, in which:

FIG. 1 illustrates an algorithm for monitoring resources and triggering an alert.

DETAILED DESCRIPTION OF DIFFERENT EMBODIMENTS OF THE INVENTION

Many combinations can be possible without departing from the scope of the invention; the skilled person will select one or the other as a function of the economic, ergonomic, dimensional or other restrictions it is to respect.

The present invention relates to a device comprising at least one computer machine and software communicating with the other hardware or software of an application chain for implementing a mechanism for monitoring and allocating resources of the IT infrastructures for an IT infrastructure making up the linking chain of a determined application.

The application chain comprises a set of resources $(R_1, \ldots, R_i, \ldots, R_n)$ used in all or part by a plurality of servers $(S_1, \ldots S_j, \ldots, S_m)$; the structuring of the application chain is therefore represented in memory by a list of identifiers $lr_i$ of resources associated with each server $S_j$.

In an embodiment, the device comprises at least a hardware and software arrangement for identification and planning of the number of users according to their profile for a given application.

The administrator determines the profile of each user as a function of the business actions taken by the latter; his actions are determined as a function of their jobs, for example, data inputs or statistical studies, but also his mastery of the application and therefore how fast he executes different actions to perform the different tasks.

The profile of each user is recorded in memory in association with its identifier in the form of an attribute $(P_1 \ldots P_l \ldots, P_o \ldots)$, by way of example job 1—novice, job 1—confirmed, job 1—expert.

Each profile is associated with a resource interval usable by users of each type of profiles. This resource interval is determined from the resolution of at least one matrix equation taking into account the available resources and the weighted average of use of resources on the part of users as a function of their profile.

In some embodiments, the matrix equation can correspond to a succession of functions refined for each resource R as a function of the number of users per profile, by way of example:

$$R_1 = [N(P_1)*MoyPond(P_1R_1) + \ldots + N(P_l)*MoyPond(P_lR_1) + \ldots + N(P_1)*MoyPond(P_oR_1)] + B(R_1)$$

$$R_j = [N(P_1)*MoyPond(P_1R_j) + \ldots + N(P_l)*MoyPond(P_lR_j) + \ldots + N(P_1)*MoyPond(P_oR_j)] + B(R_j)$$

$$R_n = [N(P_1)*MoyPond(P_1R_n) + \ldots + N(P_l)*MoyPond(P_lR_n) + \ldots + N(P_1)*MoyPond(P_oR_n)] + B(R_j)$$

With:
$N(P_x)$ represents the number of users connected having the profile $P_x$, $MoyPond(P_xR_x)$ represents the weighted consumption average of the resource $R_x$ by a connected user having the profile $P_x$, $B(R_x)$ represents the consumption value of resources $R_x$ which is constant, irrespective of the number of users, $B(R_x)$ and can be equal to zero or more.

Determining the profile of each the user for each application present on the application chain is carried out initially by the administrator who manually records, per application, for each user a profile associated with his identifier in a database or even an LDAP directory of the IT infrastructure.

After this, the administrator of the IT infrastructure will refine the categorization of users as a function of their profile, for example as a function of statistical summaries on their use of the application.

In some embodiments, this categorization can be performed on the basis of a tag associated with the identifier of a user recorded in memory. This tag can evolve over time as a function of the evolution of the user profile (for example as a function of his mastery of the application, i.e., how fast he executes different tasks or by a change in tasks performed), during use, letting the user change profile. By way of example, for a web application said tag can be the use of a cookie.

Also, such a tag lets the device know in real time the number of users connected and the distribution of the latter as a function of their profile.

This categorization is done by a module which records in memory the identification of a user and his control profile of the determined application and proceeds with creation of a history in memory.

This history lets an extrapolation module extrapolate these data of use to establish planning recorded in memory for anticipating the number of users and the distribution of their profile over a given time period (T).

By cross-referencing this information with monitoring consumptions of resources of the different servers making up the linking chain of the application, the device is able to determine the level of consumption for each profile user.

Such monitoring of consumptions of resources can be performed by way of example using consumption probes which are associated with each resource for feeding back and recording in memory, as a function of each user, measuring information or metrics representing the level of use of resources (Nur), such as described in French patent application FR 1 560 474, also filed by the owner.

In some embodiments, the device comprises at least one hardware and software arrangement for allocation of IT infrastructure resources making up the linking chain of the application which averages the levels of recorded consumption (Nur) in memory as a function of the number and of the distribution of user profiles, and calculates in memory the need for resources on the different servers making up the linking chain of the application as a function of estimation of the population (number of users and their associated profile) coming from the planning recorded for the time period T.

A module enables allocation of a confidence interval of allocatable resources on the IT infrastructure making up the linking chain of the application. The values of the interval are defined by possible minimum and maximum values as a function of the different profiles on the application chain, these values are recorded in memory and could be modified/refined over time. In fact, initially they are relatively larges then over new measuring cycles (population and consumption of resources), they will be modified/refined by an administrator and/or by a module (automatically) so that the resources allocated on the IT infrastructure correspond as closely as possible to the resources really consumed by the users.

In an embodiment, the adjustment can be made by an evaluation and adjustment module of allocated resources. Such a module verifies that the resources allocated for the time period (T) are compatible with the estimated population in the planning recorded for the time period (T+1).

If this is the case, the module verifies for the next time periods (T+2) to (T+X).

If this is not the case, the latter can send out an alert and optionally can order the resource allocation module to modify the allocatable resource interval to prevent any overconsumption or under-consumption of resources for the time period (T+1).

According to an embodiment, the device can comprise a control module of resources allocated by intervals for detecting anomalies and signaling alerts in real time when:

A maximum value of a resource is achieved,

The consumption of theoretical resources provided as a function of the connected user profiles does not correspond to the measured consumption, and/or The estimation of the consumption of resources of the application chain is outside the interval determined earlier.

So when a maximum value of a resource is achieved, and the allocatable resource interval cannot be increased, the device according to the embodiment, informs:

the administrator of the IT infrastructure so that he intervenes to limit/eliminate the saturation of the resources by allocating more, and/or informs the user of unavailability of the application and/or degradation of performances of the application.

In the other cases of alerts, the control module can order the other modules to modify the interval of allocated resources and consequently modify the data recorded in memory to obtain an allocated resource interval which corresponds to the resources really used by the IT infrastructure making up the linking chain of an application.

Such a device implements a monitoring method described by FIG. 1 comprising at least the following steps a collection and recording step in memory of the information of a repository comprising:

measuring by probes of the resources used to execute the application on the IT infrastructure of the application chain, the number of users of the application as a function of provisional planning, the average consumption of resources of each user profile determined during the cycles of previous measurements on the infrastructure.

the maximum number of allocatable resources of the IT infrastructure forming the application chain a threshold control step, for verifying whether a maximum quantity of a resource is achieved. If this is the case, the device sends out an alert for anomalies on the application chain and, according to the embodiments, blocks access to the user until return of the level of acceptable consumption of resources, and/or informs the user of the degradation in performance, and/or informs the administrator of the IT infrastructure so that he intervenes to limit/eliminate the saturation of the resources by allocating more.

An estimation step of the consumption of resources to come as a function of the provisional planning and profiles on the application chain.

A control step of the amount of resources allocated previously relative to the estimation of the consumption of resources to come.

If the estimation of consumption of resources to come does not return in the interval of previously allocated resources, the device sends out a preventive anomaly alert on the application chain and orders the allocation module to modify the allocated resource interval so that the latter corresponds to the consumption of resources to come.

A calculation step of the theoretical consumption of resources as a function of the number of users per profile and their recording in the memory and their verification relative to the really measured resources. If the latter do not correspond to the values of the allocated resource interval, the device sends out an overconsumption alert of resources on the application chain and (according to the embodiment) can optionally order the allocation module to modify the allocated resource interval and the modification in memory of the average theoretical consumptions of each profile so that the next cycle for allocation of resources corresponds better to the real consumption of resources on the part of users of the application.

In some embodiments, the present invention relates to a method for monitoring performances of the IT infrastructures making up the linking chain of a determined application, implemented by software executed on at least one machine of the IT infrastructure, characterized in that it comprises:
- a collection step of a number of users per profile on the application chain for the given time interval T,
- a determination step of a level of consumption of resources necessary for each user profile during the time interval T as a function of the number of users,
- an allocation step of an interval of allocatable resources to the application linking chain,
- an evaluation step of the number of users per profile on the application chain for the later time interval T+1,
- a verification step of the resource interval previously allocated for each of the profiles as a function of the number of users on the later time interval T+1,
- an alert step of the administrator when the resource interval previously allocated does not correspond to the number of users on the later time interval T+1, and
- optionally, a modification step of the amount of resources previously allocated for anticipating the level of consumption of resources necessary for each profile user for the later time period T+1.

It will easily be understood from reading the present application that the particular features of the present invention, as generally described and illustrated in the FIGURES, can be arranged and designed according to a wide variety of different configurations. Therefore, the description of the present invention and the attached FIGURES are not provided to limit the scope of the invention, but simply represent selected embodiments.

The skilled person will understand that the technical characteristics of a given embodiment can in fact be combined with characteristics of another embodiment unless explicitly stated otherwise or it is evident that these characteristics are incompatible. Also, the technical characteristics described in a given embodiment can be isolated from the other characteristics of this embodiment unless explicitly stated otherwise.

It must be evident for skilled persons in the art that the present invention enables embodiments in many other specific forms without departing from the field defined by the scope of the attached claims, and they must be considered by way of illustration, but can be modified in the field defined by the scope of the attached claims and the invention must not be limited to the details given hereinabove.

The invention claimed is:

1. A device comprising at least one computer machine and software for implementing a mechanism for monitoring performances of IT infrastructures for an IT infrastructure making up the linking chain of a determined application, wherein the device is constituted by at least: a hardware and software arrangement for identification and planning of the number of users according to their profile for a given application, comprising at least:
   i. an identification module on the one hand enabling identification of a user by association of an identifier with his control profile, wherein said control profile groups the habits of the user and mastery of the determined application for a time period (T), then ensuring on the other hand storing of the identifier in a memory;
   ii. an evaluation module on the one hand enabling evaluation of the number of users distributed according to their profile as a function of their habit of use of the determined application for the period (T), then ensuring on the other hand storing in a memory in the form of planning, a hardware and software arrangement for allocation of the IT infrastructure resources making up the linking chain of the application, comprising at least:
      i. for a given time period (T), an allocation module enabling allocation of an interval of allocatable resources on the IT infrastructure making up the linking chain of the application as a function of the profile and number of users, a hardware and software arrangement for monitoring, by application, the consumptions of the IT infrastructure resources making up the linking chain of the application, comprising a measuring repository, i. said measuring repository comprising a hardware and software arrangement for measuring, by consumption probes, of the level of use of each resource over the entire IT infrastructure making up the application chain during the given time period (T), then enabling storing in a memory of these levels of use in the measuring repository, in association with the given period (T), ii. an evaluation and optionally adjustment module of resources allocated for an interval defined by the given time period (T) and by a later period (T+1) of use as a function of an estimation of the number of users distributed according to their profile for a given period (T) and the later period (T+1).

2. The device according to claim 1, wherein consumption probes are associated with each resource for feeding back and recording in memory, as a function of each user, measuring information or metrics, representing the level of use of the resources (Nur), for a determined time period (T).

3. The device according to claim 1, wherein planning recorded in memory anticipates the number of users and the distribution of their profile during a given time period (T).

4. The device according to claim 1, wherein each user profile comprises a stored categorization attribute (novice, confirmed, expert) and a resource interval usable by profile for each categorization is determined as a function of the number of users.

5. The device according to claim 1, wherein the device further comprises a control module of resources allocated for each interval for detecting anomalies and signaling alerts in real time when: the maximum threshold of a resource is achieved, the consumption of theoretical resources provided and stored as a function of the connected user profiles does not correspond to the measured consumption, and/or the estimation of the consumption of the resources of the application chain is outside the intervals determined earlier.

6. A method for monitoring performances of the IT infrastructures making up the linking chain of a determined application, implemented by software executed on at least one machine of the IT infrastructure, wherein the method comprises at least: a collection step of a number of users and profiles, wherein the profiles are a function of user habits and user mastery on the application chain for a given time interval T, a determination step as a function of the number of users of a level of consumption of necessary resources corresponding to each profile user during the time interval T, an allocation step of an interval of allocatable resources to the application linking chain, an evaluation step of the number of users per profile on the application chain for the later time interval T+1, a verification step of the resource interval previously allocated for each of the profiles as a function of the number of users on the later time interval T+1, an alert step when the resource interval previously allocated does not correspond to the number of users on the later time interval T+1, and optionally, a modification step of the amount of resources previously allocated for anticipating the level of consumption of resources necessary for each profile user for the later time period T+1.

7. The monitoring method according to claim 6, wherein during the allocation step of an interval of allocatable resources to the application linking chain, a machine of the IT infrastructure verifies whether a maximum threshold of allocation of a resource is achieved, by comparing the limit of the interval to a maximum value previously recorded in the memory, if necessary an anomaly alert signal on the application chain is then sent by the machine of the IT infrastructure having performed the verification.

8. The monitoring method according to claim 6, wherein during the verification step of the size of the space previously allocated for a number of users on the later time interval T+1, a machine of the IT infrastructure signaling a preventive anomaly alert on the application chain when the consumptions for the time interval T+1 are not in the resource interval allocated for the time interval T.

9. The monitoring method according to claim 6, wherein the method further comprises a measuring step of the level of resources used in real time and a comparison step of the level of resources used in real time with the level of resources previously allocated, a machine of the IT infrastructure signaling an overconsumption alert of resources on the application chain when the consumption of the resources measured in real time is less than the level of resources allocated.

10. The monitoring method according to claim 6, wherein the method further comprises an automation step of the modification of the amount of resources allocated when an alert has been sent.

* * * * *